Patented Nov. 7, 1950

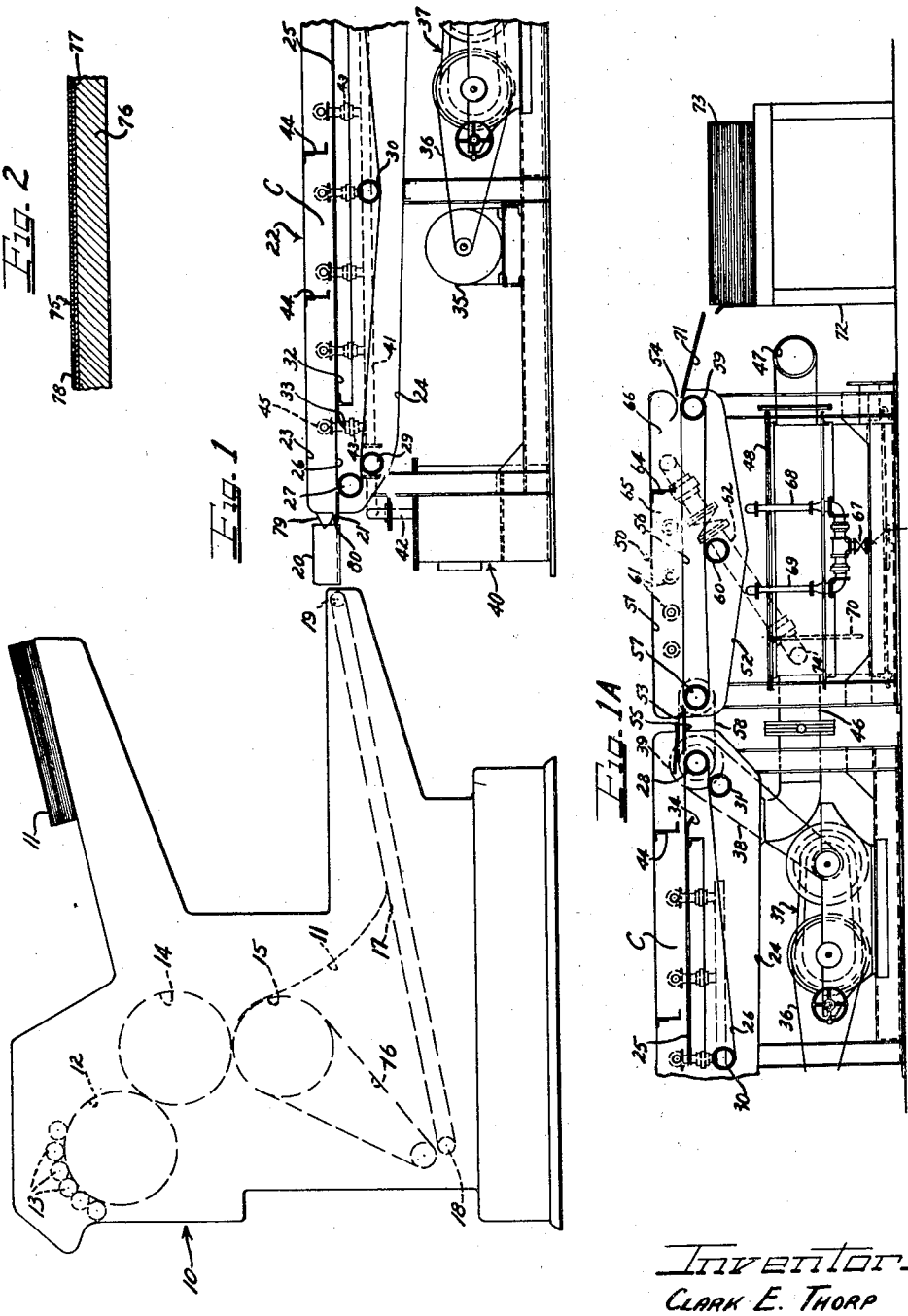

2,528,850

UNITED STATES PATENT OFFICE 2,528,850

PROCESS OF DRYING PRINTING INKS

Clark E. Thorp and Layton C. Kinney, Chicago, Ill., assignors, by mesne assignments, to The Meyercord Co., Chicago, Ill., a corporation of Illinois Application July 8, 1947, Serial No. 759,582

11 Claims. (Cl. 101—416)

This invention relates to a process of printing, and more particularly to a continuous process in which sheet-like material is printed with an ink composition susceptible of being hardened by the action of sulphur dichloride, and in which the freshly deposited ink is hardened by subjecting the imprinted material to the action of sulphur dichloride vapors, and thereafter collecting the printed material in a stack or roll.

Many types of inks, including the so-called decalcomania inks, depend for their drying properties upon their content of drying or semi-drying oils. The drying, or setting-up of such inks is due quite largely to the polymerization of the unsaturated organic compounds represented by the drying or semi-drying oils present in the ink compositions. Since polymerization of unsaturated compounds is comparatively slow at room temperature, many different aids have been proposed for increasing the rate of polymerization of the unsaturates in the ink compositions and the like. Among the aids suggested have been the use of dielectric heating, infra-red heating, ultra-violet light, ozonized air and catalysts incorporated into the compositions themselves, or employed externally.

While these various methods of aiding the drying of ink compositions and the like have met with some success, none of them has apparently been the complete answer to the problem commercially. In some instances, the methods employed have not resulted in a sufficiently rapid drying of the ink compositions to merit commercial adoption, while others have been found uneconomical for commercial operation.

We have now developed a novel process of printing in which, as a step in the printing operation, the freshly deposited, soft ink composition, is rapidly hardened, or set, without necessitating any slowing down of the printing operation. In accordance with our process, the rapid hardening of the ink compositions is accomplished by subjecting such freshly deposited compositions to the action of sulphur dichloride vapors. We have found that ink compositions containing the usual drying and semi-drying oils are very rapidly hardened as a result of the action of sulphur dichloride, and, in fact, that the rate of hardening is so rapid that the hardening step can be incorporated into the usual printing operations without slowing down such operations. Complete drying of such ink compositions can readily be obtained in a matter of a few seconds.

We have further found that even where the ink compositions do not contain oils of the drying or semi-drying types, but, instead, contain oils of the non-drying type, the action of sulphur dichloride is also effective in the rapid hardening of such ink compositions. Examples of common non-drying oils are olive oil, peanut oil and castor oil. Freshly deposited ink compositions containing such non-drying oils are hardened in less than thirty seconds by the action of sulphur dichloride vapors, and, in general, form films in less than twenty seconds that are non-tacky or only very slightly tacky. Sheet material printed with such ink compositions can be stacked in superimposed relationship or wound into rolls after being subjected to sulphur dichloride vapors for less than twenty seconds, without danger of "offsetting" of the printed matter.

In the case of decalcomania inks, to which the process of our invention is particularly directed, most decalcomania inks are a heavily bodied drying oil type of paint. The ink is mixed with a drier, usually of the cobalt type, and placed on the rolls of the press where it must function without drying for several hours. The amount of drier added must be held to a minimum to prevent the ink from drying on the rolls and thereby necessitating a long shut-down for cleaning. From a normal printing standpoint, a comparatively thick layer of ink of the order or from 0.001 to 0.002 inch in thickness, is built up by successive imprintings on the decalcomania paper. After being printed, the paper leaves the press at a linear speed that may be of the order of 1 to 3 feet per second. The comparatively thick layer of ink must now assume rapid drying properties and dry within a few seconds if the drying is to be carried out at the same speed as the printing operation and with a practical length of drying equipment. In accordance with the principles of our invention, this is accomplished by the external application to the freshly deposited ink of sulphur dichloride vapors.

As contrasted with the process of our invention, it has been customary in the manufacture of decalcomania transfers to provide a drying time that may range from overnight to as long as five days, depending upon the fullness of the form, the color of the ink being run, the composition and properties of the color that may have been previously applied to the sheet, and numerous other factors. A considerable amount of floor space must be used in the storage of the printed sheet, and particularly is it true where the printed sheets have to be racked in comparatively shallow stacks. In addition, there is the labor expense incident to the handling of the stacked sheets and periodically folding and winding the sheets to give the printed matter access to the air and thus effect the drying more uniformly and more rapidly.

Where the freshly printed sheets are subjected to the action of sulphur dichloride in vapor form, in accordance with our invention, the drying proceeds so rapidly that hardening of the fresh ink deposits can be effected while the sheets are traveling at the same rate as they travel through the printing press and within a distance of travel of from 2 to 10 feet. The drying, or hardening effect, is due to a chemical reaction between the sulphur dichloride and the organic compounds present in the ink compositions. In the case of inks containing drying oils, such as linseed oil, tung oil, and other oils of an unsaturated character, it is probable that the sulphur dichloride adds on at the double bond and that polymerization thereafter occurs. However, even where there are no unsaturated compounds present, a substitution of the sulphur dichloride for an H atom in the hydrocarbon compound apparently takes place, leaving both sulphur and chlorine bound in the molecule. While the reaction of sulphur dichloride with organic compounds containing unsaturated linkages by addition to the double bond is much more rapid than the reaction with a saturated compound by replacement of a hydrogen atom, the final products in both places are essentially the same. A relatively dry, nontacky, hard film or deposit is formed by the action of the sulphur dichloride within a relatively short time, of the order of ten seconds or less in the case of the unsaturated type of hydrocarbon, and of the order of thirty seconds or less in the case of the saturated hydrocarbon compounds.

In accordance with the principles of our present invention, sheet material is first run through the printing operation and then the freshly deposited ink composition is subjected to the action of sulphur dichloride vapors with the sheet material continuing to travel at substantially the same rate as it travels through the printing press. Since sulphur dichloride vapors are liable to have a deleterious effect upon the paper if allowed to stand in contact with the paper for any prolonged period, our process includes a cleaning step in which the excess of sulphur dichloride vapors is dissipated from the sheet material by directing over said sheet material streams of air, or other innocuous gas. As the sheet material leaves the cleaning station, it is stacked in superimposed relationship, ready for the next operation or for shipment, without drying or hardening step.

It is therefore an important object of this invention to provide a printing process in which sheet material in a continuous fashion is printed, the freshly deposited ink impressions hardened, and the printed sheet material collected with the ink impressions sufficiently hardened to eliminate the necessity of further drying or hardening operation.

It is a further important object of this invention to provide a continuous process in which sheet-like material is first printed with an ink composition that is hardenable under the action of sulphur dichloride, subjecting the sheet-like material containing the freshly deposited ink composition to the action of sulphur dichloride vapors to effect the hardening of the ink impressions, and sweeping a current of air, or other innocuous gas, over the treated surface of the material to dissipate the excess of sulphur dichloride vapors, whereby the printing and hardening of the ink impressions are carried out all in one operation.

It is a still further important object of this invention to provide a process of printing in which the hardening of the ink impressions is effected during the continued movement of the printed material and at substantially the same speed as in the printing operation, whereby subsequent operations to dry or harden the printed matter are entirely eliminated.

Other and further important objects of this invention will be apparent from the disclosures in the specification and the acocmpanying drawings.

On the drawings:

Figure 1 is a somewhat schematic broken elevational view, partly in section, of apparatus suitable for carrying out the process of our invention, illustrating the printing press equipment and a portion of the equipment used for hardening the ink deposit;

Figure 1A is a broken elevational view, partly in section, of the remaining portion of the equipment for hardening the ink deposits and dissipating the excess of sulphur dichloride vapors, and also the collecting station for the printed sheet-like material.

Figure 2 is an enlarged fragmentary sectional view of a sheet of decalcomania paper having an ink impression thereon.

The reference numeral 10 indicates generally a printing press of the type wherein sheets, such as the sheets 11, rather than a continuous web, are fed through the press and are printed during passage therethrough. It will be understood, however, that the principles of our invention apply equally well to continuous web material. The printing press 10, which is illustrated more or less schematically, includes an inking roller 12, to which ink is fed by means of a plurality of ink distributing rollers 13. As each sheet 11 passes over a backing roll 14 into the nip between said roll and the inking roll 12, a deposit of ink is left on the surface of the sheet 11. The sheets 11 are then transferred from the roll 14 to a skeleton transfer cylinder 15 that carries gripper bar chains 16, which serve to transfer the printed sheets, face up, onto a plurality of traveling belts 17. The belts 17 are tensioned around a plurality of rollers 18 and 19, one of which is driven.

From the conveyor belt 17, the sheets are delivered onto a stationary laterally flanged apron 20 and thence over a second stationary apron 21 into a treating chamber 22.

Said treating chamber 22 is made up of an upper gas hood 23 and a lower casing portion 24 which together constitute a housing. Sheet conveying mechanism, indicated as a whole by the reference numeral 25, is enclosed within said housing and comprises an endless conveyor belt 26 trained around end rolls 27 and 28. The lower run of said conveyor belt 26 is guided and supported by idler rollers 29, 30 and 31, while the upper run of said conveyor belt extends over stationary horizontal guiding strips 32, which are downwardly curved at their ends 33 and 34.

The drive for the conveyor belt 26 is from a motor 35 through a belt 36, to a Reeves drive unit, indicated generally by the reference numeral 37. From the drive unit 37, a chain 38 drives the roll 28 through a sprocket 39.

The speed of travel of the conveyor 26 is synchronized with the speed of travel of the conveyor belt 17. Accordingly, the sheets 11 are advanced through the printing press 10 and through the treating chamber 22 at the same rate of travel.

A carburetor 40 is provided for generating sulphur dichloride vapors for introduction into the treating chamber from a manifold 41 connected to the upper part of the carburetor by means of a pipe 42. The manifold 41 is provided with individual pipe connections 43 leading to horizontally extending pipes 45 within the chamber. Said chamber, which is indicated generally by the reference numeral C, is divided into a plurality of compartments by means of vertical partitions 44 extending downwardly from the top of the hood 23 and terminating in spaced relation to the conveyor 26. The transversely extending horizontal pipes 45 are provided with perforations along their undersides for the discharge of sulphur dichloride vapors against the upper surfaces of the traveling sheets 11 as such sheets are carried through the chamber C by the conveyor 26.

As shown in Figure 1A, an exhaust pipe 46 is connected to the bottom of the casing 24 near the delivery end thereof. Said exhaust conduit 46 is connected at its further end 47 to an exhaust fan (not shown), which serves to exhaust the sulphur dichloride vapors from the delivery end of the chamber C. A scrubber 48 is connected in the exhaust conduit 46 for removing sulphur dichloride vapors from the exhausted gases, as will be described in greater detail hereinafter.

From the vapor treating chamber 22, the treated sheets are led into a cleaning chamber indicated generally by the reference numeral 50 (Fig. 1A). Said cleaning chamber 50 comprises an upper hood portion 51 and a lower casing portion 52, which together constitute a housing that is substantially closed except for an entrance passage 53 and an exit passage 54. A stationary apron 55 serves to support the sheets 11 during transfer from the conveyor 26 to a conveyor 56 enclosed within the cleaning chamber 50. Said conveyor 56 is trained around a driven roll 57, driven through a chain 58 and sprocket from the roll 28, and a second roller 59. An idler roller 60 aids in supporting and tensioning the lower run of the conveyor 56.

Air, or other innocuous gas, is introduced into the chamber 50 through a plurality of pipes 61, which extend horizontally in spaced relation above the conveyor 56 and which are provided with apertures along their lower portions for directing the streams of air against the surfaces of the traveling sheets 11 as said sheets are being conveyed upon the conveyor 56. The purpose of the air streams is to dissipate the excess of sulphur dichloride vapors that may be carried along with the sheets as they leave the vapor treating chamber 22.

The cleaning chamber 50 is placed under slightly reduced pressure by means of a valve controlled pipe 62 providing a connection from the delivery end of said cleaning chamber 50 to the entrance end of the scrubber 48. A transversely extending vertical baffle 64 divides the cleaning chamber 50 into two compartments, a compartment 65 in which the pipes 61 are positioned, and a compartment 66 that is exhausted through the pipe connection 62 and the scrubber 48 by means of the exhaust fan previously referred to.

A valve controlled water connection 67 leads to the scrubber 48 through a branch pipe 68 and to the pipe connection 62 through a branch pipe 69. The scrubber 48 is provided with a baffle 70 between the discharge end 74 of the pipe connection 62 and the rest of the scrubbing chamber. Contact of the sulphur dichloride vapors with the water introduced through the water connection 67 effects the hydrolysis of the sulphur dichloride, with the result that the sulphur dichloride breaks down into sulphur, in colloidal form, and hydrochloric acid. The sulphur is thus carried away with the wash water from the scrubber and the gases exhausted through the exhaust fan are rendered innocuous.

From the cleaning chamber 50, the sheets 11 pass over an inclined apron 71 to be deposited upon a table 72 in a stack indicated at 73.

In Figure 2 there is illustrated a decalcomania sheet, indicated generally by the reference numeral 75 and comprising a paper base 76 having a continuous film 77 thereover formed of a dextrin and starch composition. It is the film 77 that, when the sheet is moistened, enables the decalcomania to be slipped off of the paper base 76. An ink deposit over the dextrin and starch layer 77 is indicated generally by the reference numeral 78. The ink deposit 78 may be either a single impression, or it may be the result of a plurality of impressions, since it is customary in decalcomania printing to superimpose a plurality of impressions in order to build up the final decalcomania film. The thickness of each impression, or printing, may be of the order of 0.00015 inch, while the average thickness of the decalcomania printed film may be of the order of 0.0008 inch in thickness. The finished decalcomania includes an outer protective film, usually of nitrocellulose, which is applied after the completion of the printing operation.

The ink compositions that may be used in the printing of the sheets 11 may be of the conventional formulae in which a drying oil, or semi-drying oil is employed, or they may be formulations embodying so-called non-drying oils. Without exception, rapid film formation is produced with all formulations under the action of the sulphur dichloride vapors, regardless of whether the oil constituent of the ink compositions is commonly classified as a drying or a non-drying oil. In the case of ink compositions containing non-drying oils only, however, the rate of drying is appreciably slower, being of the order of 30 seconds or less, whereas with the ink compositions embodying drying or semi-drying oils, the time required to form a dry, hard film, may be of the order of twenty seconds, or less, but is usually only a matter of two or three seconds.

In order to establish the effect of sulphur dichloride vapors on various ink compositions, the following formulations were prepared and tested by exposure of approximately 0.001 to 0.002 inch thick films on decalcomania paper to air saturated with sulphur dichloride vapors:

| Non-Drying Oil Compositions | Parts by Weight | Reaction with SCl₂ |
|---|---|---|
| #1 | | |
| Cold pressed castor oil | 40 | Formed film in less than 20 sec. Film slightly tacky. |
| Rosin ester | 20 | |
| Mineral spirits | 10 | |
| Titanium dioxide | 70 | |
| #2 | | |
| Olive oil | 40 | Formed film in less than 20 sec. Film slightly tacky. |
| Rosin ester | 20 | |
| Mineral spirits | 10 | |
| Titanium dioxide | 70 | |
| Semi-Drying Oil Compositions | Parts by Weight | Reaction with SCl₂ |
| #3 | | |
| Corn oil | 40 | Formed film in less than 20 sec. Film slightly tacky. |
| Rosin ester | 20 | |
| Mineral spirits | 10 | |
| Titanium dioxide | 70 | |
| Drying Oil Compositions | Parts by Weight | Reaction with SCl₂ |
| #4 | | |
| Heat bodied linseed oil | 40 | Dried in less than 10 sec. Slight tack. |
| Rosin ester #10 | 20 | |
| Mineral spirits | 10 | |
| Titanium dioxide | 10 | |
| #5 | | |
| Heat bodied linseed oil | 20 | Dried in less than 10 sec. Slight tack. |
| Raw tung oil | 20 | |
| Rosin ester | 20 | |
| Mineral spirits | 10 | |
| Titanium dioxide | 70 | |
| #6 | | |
| Alkyd resin (drying oil modified) | 60 | Dried in less than 10 sec. Slight tack. Hard film. |
| Mineral spirits | 40 | |
| Titanium dioxide | 100 | |
| Alkylated Resin Compositions | Parts by weight | Reaction with SCl₂ |
| #7 | | |
| Alkyd modified melamine resin (solvent soluble type) | 110 | Dried in less than 10 sec. No tack. Hard film. |
| Butanol | 50 | |
| Mineral spirits | 50 | |
| Titanium dioxide | 210 | |
| #8 | | |
| Urea resin (solvent soluble type) | 30 | Dried in less than 10 sec. No tack. Hard film. |
| Octyl alcohol | 3 | |
| Butyl alcohol | 12 | |
| Hydrogenated naphtha | 5 | |
| Titanium dioxide | 50 | |

The rosin ester in each of the above Formulae 1, 2, 3, 4 and 5, was a glycerol ester of hydrogenated rosin. The rosin ester is added primarily to impart body to the oil where oils of low initial viscosity are used. It should be understood, however, that a large variety of such resins could be used to achieve this purpose without materially affecting the drying properties of the film in sulphur dichloride vapors. The drying effects are due primarily to the character of the basic oils in these formulae.

In Formulae 7 and 8, the resin was of the solvent soluble type. This means that the resin contains alkyl groups, since alkylation of the basic resin compound is the common expedient used to render the resin solvent soluble. It is believed that the action of sulphur dichloride vapors on the alkylated resins results in a splitting off of the alkyl groups to render the resin insoluble. This, of course, is a quite different action from that of the sulphur dichloride vapors on the oils. In the case of the drying oils, which are unsaturated fatty oil compounds, an addition of the sulphur dichloride molecule at the double bond probably occurs, followed by polymerization. In the case of oils containing no unsaturated compounds, a substitution of the sulphur dichloride molecule for an H atom in the hydrocarbon compound apparently takes place, leaving both sulphur and chlorine bound in the molecule. While the reaction of the sulphur dichloride with organic compounds containing unsaturated linkages by addition to the double bond is much more rapid than the reaction with a saturated compound by replacement of a hydrogen atom, the final products in both cases are hardened and relatively dry and non-tacky.

In the above formulae, titanium dioxide serves as the pigment. It will be understood, however, that other pigments and coloring matters may be employed, and, in general, any pigment or coloring matter that is customarily used in ink formulations.

In operation, sheets 11 from the supply stack are fed into the printing press 10 for receiving an ink impression from the inking roller 12. The linear speed of travel of the sheets 11 through the printing press 10 will be of the order of 1 foot per second. The printed sheets are transferred from the roller 14 by means of the skeleton roller 15 and gripper bar conveyor 16 onto the conveyor 17, with the printed face of the sheets uppermost.

From the conveyor 17, the printed sheets are delivered over the aprons 20 and 21 into the vapor treating equipment 22. An adjustable gate member 79 cooperates with the apron 21 to restrict the opening providing an entrance 80 for the sheets in their passage into the vapor treating equipment 22. The sheets are there deposited onto the surface of the conveyor 26, by means of which the sheets are advanced through the chamber C to the delivery apron 55, and thence into the cleaning chamber 50.

The sulphur dichloride vapors for the treating chamber C are generated in the carburetor 40 by passing air under low pressure, such as 5 pounds per square inch, upwardly through the body of liquid sulphur dichloride contained in the carburetor. As the air bubbles through the liquid sulphur dichloride, it becomes saturated with sulphur dichloride vapors and passes out through the pipe 42 into the manifold 41 and thence into the individual pipes 43 to issue from the transversely extending horizontal pipes 45. As the sulphur dichloride vapors issue from the perforated pipes 45, they are directed downwardly against the upper surfaces of the sheets 11 being carried through the chamber C on the conveyor 26. Said conveyor may be suitably formed of Monel metal and of such width as to support the sheets 11 over their entire area. Only the upper, printed faces of the sheets 11 are thus exposed directly to the action of the sulphur dichloride vapors. The under surfaces of the sheets 11, which are the uncoated surfaces of the paper base, are thus not directly subjected to the action of the sulphur dichloride vapors. The absorption of sulphur dichloride vapors into the sheets 11 is thereby minimized, since the upper surfaces of the paper base are protected by the dextrin and starch film 77 and also in part at least, by the ink film, or deposit, 78. In this way, there is a minimum attack of the paper base by the sulphur dichloride vapors, and therefore practically no deleterious effect upon the paper itself.

The speed of travel of the conveyor 26 is synchronized to the speed of travel of the conveyor 17, so that the paper sheets are advanced through the chamber C at the same rate of linear travel as through the press 10. Similarly, since the conveyor 56 in the cleaning chamber 50 is driven from the roll 28 through the chain 58 and sprockets of the same diameter, the linear speed of travel of the two conveyors 26 and 56 is the same.

In the chamber 50, the air streams from the perforated pipes 61 are directed against the treated upper surfaces of the sheets 11 as they pass through the cleaning chamber. Said air streams thus serve to dissipate any excess of sulphur dichloride vapors carried along with the sheets 11. Both the delivery end of the paper treating equipment 22 and the delivery end of the cleaning chamber 50 are connected through the scrubber 48 to an evacuating fan. As a result, both the vapor treating chamber and the cleaning chamber are placed under a slightly reduced pressure so as to eliminate as much as possible any escape of sulphur dichloride vapors from these chambers into the atmosphere. As previously explained, the gases evacuated from these chambers are scrubbed in the scrubber 48 to remove the sulphur dichloride vapors so that the evacuating fan can be exhausted into the atmosphere without seriously polluting it.

The length of the vapor treating chamber C is such that the sheets 11 remain subjected to the action of sulphur dichloride vapors in said chamber for a sufficient length of time to complete the hardening or drying of the ink film 78. Where the ink composition is of the usual drying type, the amount of dwell in the chamber C need be only from 1 to 3 seconds, and the chamber C only from 2 to 7 feet long, but by lengthening the chamber C the time of dwell can be increased to as much as thirty seconds, if necessary, as in the case of ink compositions containing non-drying oils.

By the time the sheets 11 are delivered from the cleaning chamber 50 onto the inclined apron 71 through the restricted exit 54, the sheets are largely purged from any remaining sulphur dichloride vapors and can be immediately stacked in superimposed relationship, as in the stack 73. The ink films or deposits are by then sufficiently hard and non-tacky as to prevent any offsetting of the printing while the sheets are in stacked relationship. No further drying of the ink impressions produced in this pass of the sheets 11 through the printing press 10 is, therefore, required. In this way the usual overnight drying period and all of the labor of winding the sheets that is customarily employed, may be eliminated.

The sheets 11 will be subjected to a similar series of printing, hardening, cleansing and stacking operations after each successive impression of ink in building up the finished decalcomania. Since there are ordinarily as many as from four to six or more passes through the printing presses in the making of a finished decalcomania sheet, the saving of time in the drying of the successive impressions of ink is very substantial.

The specific type of apparatus illustrated in the drawing is not our invention but is shown merely for the purposes of illustrating the manner in which the process of our invention may be carried out.

It will of course, be understood that various details of the process may be varied through a wide range without departing from the principles of this invention and it is, therefore, not the purpose to limit the patent granted hereon otherwise than necessitated by the scope of the appended claims.

We claim as our invention:

1. The process of printing, which comprises depositing on sheet material an ink composition containing a fatty oil, and subjecting said freshly deposited composition to the action of sulphur dichloride vapors to harden said composition.

2. As a continuous process, the steps of printing on moving sheet-like material to leave thereon soft deposits of an ink composition containing a fatty oil and bringing vapors of sulphur dichloride into contact with said moving material to harden said deposits.

3. As a continuous process, the steps of printing on moving sheet-like material to leave thereon soft deposits of an ink composition containing a fatty oil and without change in speed of movement passing said moving material into an atmosphere of sulphur dichloride vapors to harden said deposits.

4. In a printing process, the steps of passing sheet-like material to an ink-receiving station, depositing on said material a soft ink composition containing a substance hardenable under the action of sulphur dichloride selected from the group consisting of drying oils, semi-drying oils and resins modified with fatty oils, passing said inked material to a sulphur dichloride applying station, bringing sulphur dichloride vapors into contact with said soft ink deposits to harden the same and passing said material to a receiving station, the movement of said material from station to station being continuous and at a substantially constant rate of speed.

5. In a printing process, the steps of passing sheet-like material to an ink-receiving station, depositing on said material a soft ink composition containing a substance hardenable under the action of sulphur dichloride selected from the group consisting of drying oils, semi-drying oils and resins modified with fatty oils, passing said inked material to a sulphur dichloride applying station, bringing sulphur dichloride vapors into contact with said soft ink deposits to harden the same, dissipating by a stream of air any excess sulphur dichloride vapors from said material on leaving said last station, and passing said material to a receiving station, the movement of said material from station to station being continuous and at a substantially constant rate of speed.

6. In a continuous printing process, the steps of applying to moving sheet material a soft deposit of a composition containing a fatty oil hardenable under the action of sulphur dichloride, contacting said deposit with sulphur dichloride vapors, directing a stream of air against said material to dissipate excess vapors and stacking said sheet material.

7. In a continuous printing process, the steps of applying to moving sheet material a soft deposit of a composition containing a fatty oil hardenable under the action of sulphur dichloride, contacting said deposit with sulphur dichloride vapors for a period of time not exceeding 20 seconds, directing a stream of air against said material to dissipate excess vapors and stacking said sheet material.

8. In a continuous process of printing and of hardening the printed deposits, the steps of printing on moving sheet-like material soft deposits of an ink composition containing a fatty oil constituent, and passing said printed material into an atmosphere of sulphur dichloride vapors to harden such deposits by contact with said vapors.

9. In a continuous process of printing and of hardening the printed deposits, the steps of printing on moving sheet-like material soft deposits of an ink composition containing a fatty oil constituent, passing said printed material into an atmosphere of sulphur dichloride vapors to harden such deposits by contact with said vapors, and directing a flow of air over said vapor-contacted material to dissipate excess vapors from said material.

10. The process of printing on sheet material with an ink of such composition as to be hardenable under the action of sulphur dichloride, which comprises printing on said material a soft deposit of an ink composition containing a resin, a pigment and a fatty oil, subjecting said deposit to the action of sulphur dichloride to harden said deposit, sweeping the printed surface of said material with a gaseous medium to dissipate therefrom any excess of sulphur dichloride and stacking said treated sheet material in superimposed relationship, said material being moved at substantially constant speed through said various steps of printing to stacking.

11. The process of printing on sheet material with an ink of such composition as to be hardenable under the action of sulphur dichloride, which comprises printing on said material a soft deposit of an ink composition containing a resin, a pigment and a fatty oil, subjecting said deposit for not to exceed twenty seconds to the action of sulphur dichloride vapors to harden said deposit, sweeping the printed surface of said material with a gaseous medium to dissipate therefrom any excess of sulphur dichloride vapors and stacking said treated sheet material in superimposed relationship, said material being moved at substantially constant speed through said various steps of printing to stacking.

CLARK E. THORP.
LAYTON C. KINNEY.

REFERENCES CITED

The following references are of record in the file of this patent:

UNITED STATES PATENTS

| Number | Name | Date |
|---|---|---|
| 1,159,257 | Nirth | Nov. 2, 1915 |
| 1,159,258 | Nirth | Nov. 2, 1915 |
| 1,566,785 | Van Der Muehlen | Dec. 22, 1925 |
| 2,157,388 | MacArthur | May 9, 1939 |
| 2,208,587 | Kienle | July 23, 1940 |

OTHER REFERENCES

Inorganic Chemistry by Hinds, 2nd edition (1909) John Wiley & Sons, N. Y. C., pages 275 and 276. Copy in Scientific Library.

Printing Inks (Ellis) Reinhold Publishing Corp. 330 West 42nd St., New York city (1940) page 110. Copy in Division 17.